(12) United States Patent
Manuel et al.

(10) Patent No.: US 7,195,223 B2
(45) Date of Patent: Mar. 27, 2007

(54) SYSTEM AND A METHOD FOR COOLING A TOOL

(76) Inventors: Mark Manuel, 14377 Knightsbridge, Shelby Township, MI (US) 48315; Thomas N. Greaves, 1425 Stockport Dr., Rochester Hills, MI (US) 48309

(*) Notice: Subject to any disclaimer, the term of this patent is extended or adjusted under 35 U.S.C. 154(b) by 239 days.

(21) Appl. No.: 10/308,602

(22) Filed: Dec. 2, 2002

(65) Prior Publication Data

US 2004/0103709 A1     Jun. 3, 2004

(51) Int. Cl.
*B21D 37/16*     (2006.01)
(52) U.S. Cl. .................... 249/79; 249/160; 29/428; 264/219
(58) Field of Classification Search ............ 249/79, 249/80, 81, 160; 425/DIG. 30; 264/219; 29/428
See application file for complete search history.

(56) References Cited

U.S. PATENT DOCUMENTS

| | | | |
|---|---|---|---|
| 1,539,887 A | | 6/1925 | Vandergrift |
| 3,249,672 A | * | 5/1966 | Richards et al. ............ 264/219 |
| 3,416,766 A | | 12/1968 | Miller |
| 4,141,531 A | | 2/1979 | Strausfeld |
| 4,474,722 A | | 10/1984 | Martin |
| 4,702,969 A | | 10/1987 | Bunkoczy |
| 4,746,055 A | | 5/1988 | Ingram |
| 4,810,591 A | | 3/1989 | Sakai |
| 4,867,412 A | * | 9/1989 | Greune ........................ 249/83 |
| 4,946,552 A | | 8/1990 | Onnie |
| 4,997,602 A | | 3/1991 | Trimble |
| 5,031,483 A | | 7/1991 | Weaver |
| 5,032,469 A | | 7/1991 | Merz |
| 5,079,102 A | | 1/1992 | Tanaka |
| 5,106,290 A | | 4/1992 | Carver et al. |
| 5,151,167 A | | 9/1992 | Truong |
| 5,156,322 A | | 10/1992 | Thoi |
| 5,247,861 A | | 9/1993 | Jahn |
| 5,256,496 A | | 10/1993 | Kluczynski |
| 5,273,803 A | | 12/1993 | Metcalf |
| 5,330,343 A | | 7/1994 | Berteau |
| 5,345,052 A | | 9/1994 | Puddephatt |
| 5,347,423 A | | 9/1994 | deNeuf |
| 5,377,116 A | | 12/1994 | Wayne et al. |
| 5,399,239 A | | 3/1995 | Pai |
| 5,400,946 A | | 3/1995 | Weise |
| 5,421,544 A | | 6/1995 | Roop |

(Continued)

FOREIGN PATENT DOCUMENTS

DE    3711470 A1    10/1988

(Continued)

OTHER PUBLICATIONS

Walczyk et al., "Rapid Tooling for Sheet Metal Forming Using Profiled Edge Laminations—Design Principles and Demonstration", Nov. 1998.*

(Continued)

*Primary Examiner*—Donald Heckenberg
(74) *Attorney, Agent, or Firm*—Law Offices of John Chupa & Associates, P.C.

(57) ABSTRACT

A tool (10) having improved heat transfer characteristics and a method for cooling a tool (10) which is comprised of several selectively coupled sectional members (12–17) Each selected sectional members (16) include an outer contour (19), while each of the sectional members (12–17) includes at least one coolant passage (14). These coolant passages (14) cooperatively form a coolant manifold (18) which is a predetermined distance from contours (19). An amount of coolant 40 is passed through manifold (18) to cool tool (10).

17 Claims, 3 Drawing Sheets

U.S. PATENT DOCUMENTS

| | | |
|---|---|---|
| 5,439,622 A | 8/1995 | Pennisi et al. |
| 5,462,263 A | 10/1995 | Feltrin |
| 5,529,805 A | 6/1996 | Iacovangelo |
| 5,641,448 A | 6/1997 | Yeung |
| 5,779,833 A | 7/1998 | Cawley et al. |
| 5,792,492 A | 8/1998 | Takahashi |
| 5,793,015 A | 8/1998 | Walczyk |
| 5,830,585 A | 11/1998 | Hosoe |
| 5,847,958 A | 12/1998 | Shaikh et al. |
| 5,869,353 A | 2/1999 | Levy |
| 5,878,619 A | 3/1999 | Walczak |
| 5,948,548 A | 9/1999 | Welty |
| 6,024,851 A | 2/2000 | Radhakrishnan |
| 6,025,036 A | 2/2000 | McGill |
| 6,038,525 A | 3/2000 | Maguire |
| 6,060,392 A | 5/2000 | Essaian |
| 6,063,436 A | 5/2000 | Pavell |
| 6,081,328 A | 6/2000 | Eng |
| 6,090,207 A | 7/2000 | Knauss |
| 6,090,507 A | 7/2000 | Grenon |
| 6,103,402 A | 8/2000 | Marcin, Jr. |
| 6,109,332 A | 8/2000 | Sachs |
| 6,113,752 A | 9/2000 | Hollstein |
| H1933 H | 1/2001 | Zabinski |
| 6,355,331 B2 | 3/2002 | Hillier |
| 6,391,473 B2 | 5/2002 | Numakura |
| 6,401,001 B1 | 6/2002 | Jang et al. |
| 6,472,029 B1 | 10/2002 | Skszek |
| 6,495,272 B1 | 12/2002 | Creber |
| 6,627,835 B1 | 9/2003 | Chung |
| 2002/0175265 A1* | 11/2002 | Bak et al. ............ 249/79 |
| 2004/0128016 A1* | 7/2004 | Stewart ............. 700/159 |

FOREIGN PATENT DOCUMENTS

| | | | |
|---|---|---|---|
| EP | 0 775 550 A1 | | 5/1997 |
| EP | 1216 806 A2 | | 6/2002 |
| GB | 1 425 626 | | 8/1973 |
| JP | 58-091123 | | 5/1983 |
| JP | 04-86212 | * | 3/1992 |
| WO | WO 8707538 | | 12/1987 |
| WO | WO 88/07932 | | 10/1988 |
| WO | WO 95/08416 | | 9/1994 |
| WO | WO 01/70450 | * | 9/2001 |
| WO | WO 03043795 | | 5/2003 |
| WO | WO-A-9508416 | | 8/2004 |

OTHER PUBLICATIONS

Nakagawa, T. et al., "Laser Cut Sheet Laminated Forming Dies by Diffusion Bonding" (1985).*

A New Rapid Tooling Method For Sheet Metal Forming Dies Inventor: Daniel Walczyk, undated.

English abstract for JP 04-86212.*

* cited by examiner

SYSTEM AND A METHOD FOR COOLING A TOOL

FIELD OF THE INVENTION

The present invention generally relates to a tool and to a method for cooling a tool and more particularly, to a laminated tool which is formed by the creation and the selective coupling of members which have a plurality of passages and which are rigidly and selectively sealed in an efficient manner, thereby allowing for the creation of a relatively strong tool having an internal coolant manifold in an efficient and relatively inexpensive manner.

BACKGROUND OF THE INVENTION

A tool, such as a mold, die, or other object formation apparatus is used to repeatedly form or create substantially similar objects or products. Conventionally, the tool is formed by machining or "working" a block of material in a certain manner, thereby forming or creating the tool in a desired shape and geometrical configuration. Alternatively, the tool may be formed by a laminar process in which various sectional members are created and selectively coupled, effective to allow the coupled members to cooperatively form the tool.

Particularly, a formed tool is adapted to be used in a wide variety of processes to create these objects or apparatuses and many of these processes cause the tool to become hot and/or cause the produced object or product to become hot. The created heat may cause the produced product to be "deformed" or to be an undesired shape or configuration.

In order to address these heat related difficulties, holes are typically drilled into the conventionally formed tool to create cooling passages within the tool. Typically, a cooling medium such as water or oil is passed through the tool to extract heat from the part produced and from the tool While the foregoing approach does allow for the creation of cooling passages, it represents a relatively inefficient and costly process which undesirably increases the overall cost of production and may undesirably create distortion in the formed part. Such distortion is particularly undesirable since many of these parts are relatively expensive and may not be salvagable. Thus, the distorted parts must be scrapped which adds cost and inefficiency to the manufacturing process.

Additionally, in high-pressure manufacturing techniques such as injection molding, attention has to be given to adequately support the tool surface so that it does not deflect under molding pressures. Therefore, cooling holes which are drilled into a tool must be at least a minimum distance from the lowest or deepest contour cut into the mold and portions of the mold which are not cut as deep as the lowest contour have more material (i.e., metal) to conduct heat through and undesirably cause uneven/inefficient cooling of the tool.

There is therefore a need for a method to selectively create cooling passages within a tool which overcomes some or all of the previously delineated drawbacks of prior techniques. Moreover, there is a further need to create a tool by the use of a method which allows cooling passages to be efficiently formed within the tool and which does not potentially cause distortion in the product produced. These and other needs are addressed by the present as is more fully delineated below.

SUMMARY OF THE INVENTION

It is a first non-limiting advantage of the present invention to provide a method for creating cooling passages within a tool which overcomes some or all of the previously delineated drawbacks of prior techniques.

It is a second non-limiting advantage of the present invention to provide a method for creating a tool which overcomes some or all of the previously delineated drawbacks and which, by way of example and without limitation, allows for the efficient formation of cooling passages within the tool.

It is a third non-limiting advantage of the present invention to provide a tool having cooling passages which may be efficiently and integrally formed within the tool and which allow a created item to be efficiently cooled while concomitantly increasing the quality of the produced part.

According to a fourth advantage of the present invention, a tool is provided. Particularly, the tool comprises a plurality of sectional members which are coupled together, wherein the plurality of sectional members each have at least one coolant passage and at least one of the plurality of section members has an outer contour which is disposed a certain minimum distance from the at least one coolant passage.

According to a fifth advantage of the present invention a laminated tool having improved cooling characteristics is provided. Particularly, the laminated tool comprises a plurality of first sectional members each having a certain contour and at least one cooling passage which is a certain predetermined distance from the forming surface; wherein the plurality of sectional members are coupled together, effective to cause the certain contours to form a forming surface and to cause the at least one cooling passages to form a cooling manifold; and an amount of material which is disposed within the cooling manifold, effective to cool the tool.

According to a sixth advantage of the present invention, a method is provided for forming a tool having improved cooling characteristics. The method comprises the steps of forming at least one first member having a first outer contour and at least one first inner passage which is disposed a certain predetermined distance from the first outer contour; forming at least one second member having a second outer contour and at least one second inner passage which is disposed the certain predetermined distance from the second outer contour; and attaching the at least one first member to the at least one second member wherein the first outer contour cooperates with the second outer contour to form a mold surface and the first inner passage is communicatively coupled to the second inner passage to form a manifold.

These and other features, aspects, and advantages of the present invention will become apparent to those of ordinary skill in the art from a reading of the following detailed description of the preferred embodiment of the invention and by reference to the following drawings.

DETAILED DESCRIPTION OF THE PREFERRED EMBODIMENT OF THE INVENTION

Figure 1:
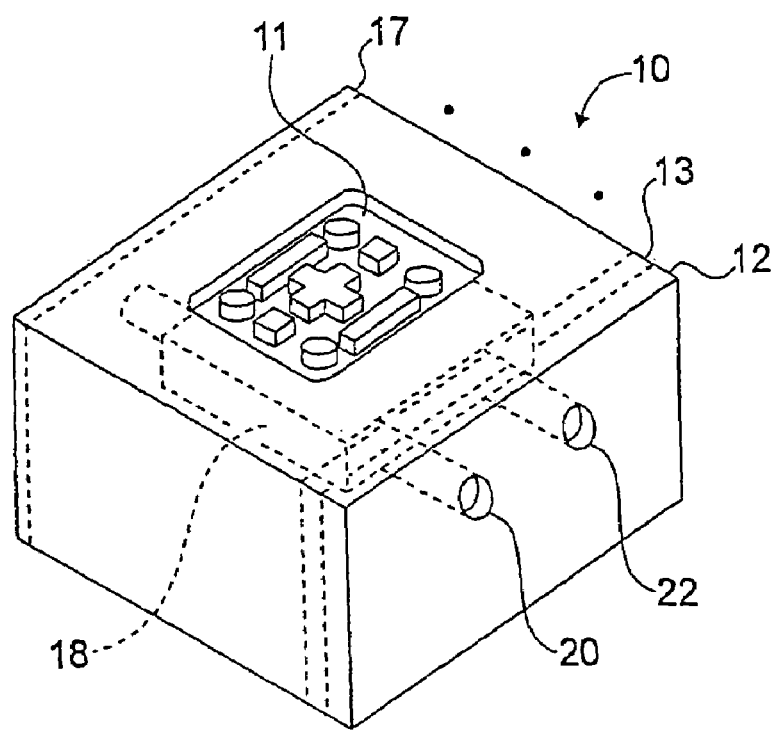
FIG. 1 is a perspective view of a tool which is made in accordance with the teachings of the preferred embodiment of the invention having a partial hidden view of the cooling manifold.
Figure 2:
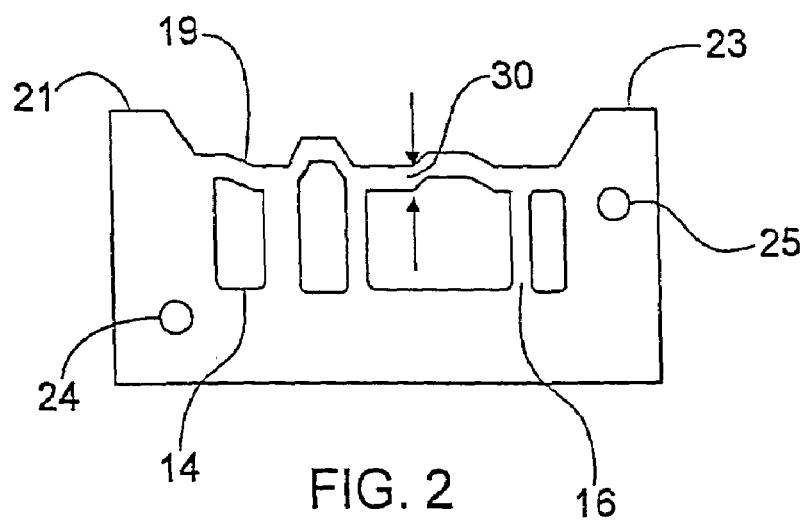
FIG. 2 is a side view of one of the sectional members which form the tool which is shown in FIG. 1.

Referring now to FIGS. 1 and 2, there is shown a tool 10 which is made in accordance with the teachings of the preferred embodiment of the invention. It should be realized that tool 10 may be of any substantially desired shape or geometric configuration and that nothing in this Application is intended to limit the applicability of the invention to a particular type of tool or apparatus. Rather, the tool 10 is only one non-limiting example of a tool which may be produced according to the invention. In the preferred embodiment of the invention, tool 10 comprises a mold member having a contoured forming or mold surface 11.

As shown best in FIGS. 1 and 2, mold surface 11 is formed by the coupling of a plurality of adjacent sectional members (e.g., members 12–17). That is, at least one of these sectional members 16 include a predetermined contour or shape 19 formed into its "top" surface 21. As each adjacent section member 12–17 is connected together, each contour 19 cooperates to form mold surface 11.

It should be appreciated that tool 10 represents "one-half" of a molding tool and another tool having a mold surface complementary to mold surface 11 (not shown) is conventionally used to create an item. While both complementary mold tools are conventionally and cooperatively used in a molding process, the following discussion will focus upon tool 10 as both tools are made in a substantially identical manner.

Figure 3:
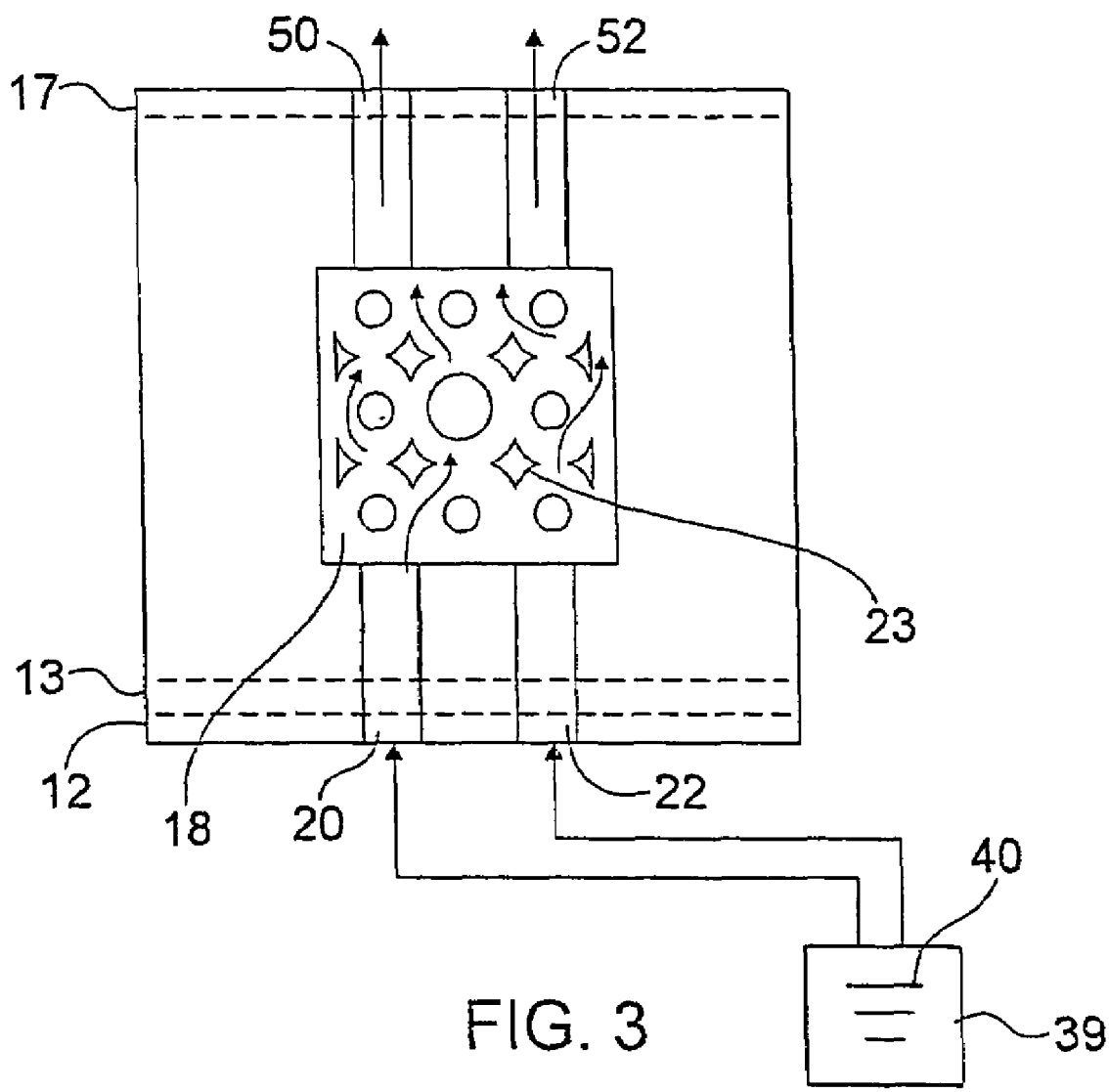
FIG. 3 is a top sectional view of the tool which is shown in FIG. 1 through the cooling manifold.

Particularly, tool 10 is made by the use of a lamination process in which several sectional members, such as sectional members 12, 13, 16, 17 are selectively formed and then selectively coupled or connected in a predetermined manner in order to cooperatively form the tool 10. It should be appreciated that nothing in this Application is meant to limit the applicability of the invention to a particular type, shape, or configuration of sectional members. Moreover, the sectional members which are shown in FIGS. 1–3, such as sectional members 12, 13, 16, 17 are used for illustrative purposes only and are not meant to limit the scope of the invention in any manner.

Tool 10 is made by the use of a lamination process in which several sectional members, such as sectional members 12, 13, 16, 17 are selectively formed and then coupled or connected together in a predetermined order to cooperatively form the tool 10 having a mold surface 11 and a cooling manifold 18 formed by a plurality of cooling passages 14 which are formed within selected sectional members 12, 13, 16, 17.

Particularly, as will be noted from the discussion below and according to the preferred embodiment of the invention, cooling passages are selectively formed between adjacent sectional members having at least one cooling passage 14 (e.g., members 12, 13) by the cooperation of respective portions of the sectional members having a desired shape or geometric configuration and these cooling passages interconnect to form cooling manifold 18 and allow water, oil, ethylene glycol, and/or other material 40 to traverse the tool 10 in order to cool the tool 10 and to cool the item or product which may be formed within mold surface 11. The term "adjacent" as is used in this description means the sectional members abut and are physically connected. It should be apparent that by allowing this cooling manifold 18 to be created by structural portions or physical attributes and/or characteristics of the sectional members 12–17 the need to drill cooling holes through the tool 10 is obviated. This reduces/eliminates the potential for damage to the tool 10 and concomitantly provides a more efficient distribution of the cooling material 40 through the tool 10.

As shown in FIG. 2, each unique sectional member, such as sectional member 16 may include an upper mold contour 19 and a plurality of cooling passages 14. In the preferred embodiment of the invention, each sectional member 16 is formed of a relatively strong and wear resistant material, for example and without limitation, a steel. Cooling passages 14 are formed within member 16 substantially "beneath" contour 19.

It should be appreciated that each individual sectional member, such as member 16, can maintain the predetermined minimum required "wall thickness" or distance 30 for the particular material tool 10 is made from to ensure tool 10 does not deflect during high pressure applications. That is, each cooling passage 14 formed into a sectional member 16 can be formed a predetermined distance from the portion of the contour 19 which is directly above or adjacent to that passage 14. It should be appreciated that distance 30 will vary for various molding operation and is dependent upon the pressures involved and the material tool 10 is formed from. For example and without limitation, the pressures involved in an injection molding process are higher than in foam or blow molding processes and subsequently distance 30 would necessarily be larger for an injection molding tool than in a foam molding tool or blow molding tool.

In one non-limiting example, a tool 10 formed from a steel material may have a distance 30 of approximately 0.25–0.50 inches (6.35–12.7 millimeters) to provide sufficient rigidity and strength to avoid deflection during a relatively high pressure molding process, such as an injection molding operation. In relatively low pressure molding processes, such as foam molding or blow molding, the distance 30 for a steel tool 10 would be approximately 0.1–0.25 inches (2.54–6.35 millimeters), as the pressures involved are not as high. It should be appreciated that the distance 30 varies depending upon which material tool 10 is formed from, as each tool 10 may be formed from substantially any material a variety of strength characteristics.

Further, depending upon the depth and shape of the contour 19, cooling passage 14 may be raised or lowered relative to an adjacent sectional member's corresponding cooling passage to accommodate changes in the surface of mold surface 11. Cooling manifold 18, therefore, may be dynamically configured to "follow" the shape of surface 11 by changing the location and/or shape of the cooling passages 14 to correspond to the contour 19 which is immediately above that passage. Subsequently, the preferred embodiment of the invention increases the cooling efficiency of tool 10 while concomitantly maintaining the necessary wall thickness 30 to prevent any deflection during high pressure use.

As shown in FIGS. 2 and 3, the support provided by the predefined "minimum" wall thickness 30 is augmented by a plurality of support members 23 which traverse cooling manifold 18. These supports 23 are disposed throughout manifold 18 and are formed by the spaces present between the individual coolant passages 14. Support members 23 cooperatively cause cooling passages 14 which form manifold 18 to cut a winding, "honey-combed", or non-linear path through tool 10. This non-linear configuration of manifold 18 increases turbulent flow of material 40 through tool 10 and thereby increases the thermal transfer characteristics of tool 10. Furthermore, the gradually varying "heights" or locations of interconnecting cooling passages 14, i.e., the geometry transitions of adjacent passages having different "elevations" due to changes in contour 19, creates an offset or "stair step" between adjacent sectional members which further results in greater turbulent flow.

As shown in FIGS. 1 and 3, tool 10 further includes conduits or bores 20, 22 and 50, 52 which are formed from aligned apertures formed within the outer-most sectional members (e.g., members 12, 13, and 17) of tool 10. As shown, conduits 20, 22, 50, 52 communicatively couple cooling manifold 18 with the exterior of tool 10. In the preferred embodiment of the invention, conduits 20, 22 are coupled to a source 39 of coolant material 40 while conduits 50, 52 function to remove or exhaust heated material 40 from tool 10. In one non-limiting embodiment of the invention conduits 50, 52 are coupled to a heat exchanger assembly (not shown) to cool and/or condense the heated material 40 exiting tool 10 and redirect the material 40 back to source 39 (e.g., conduits 50, 52 cooperate with a heat exchanger which is coupled to source 39 and as act as a self contained coolant return system).

It should be apparent that the above description of conduits 20, 22, 50, and 52 are for exemplary purposes only and that various configurations and numbers of coolant conduits coupling manifold 18 to a source 39 of material 40 are intended. For example and without limitation, one embodiment of tool 10 may omit exhaust conduits 50, 52 and instead use a first conduit 20 on one side of the tool 10 to supply material 40, while utilizing another conduit 22 on the same side to function as the return back to source 39.

As shown in FIG. 2, in another non-limiting embodiment of the invention each sectional member 12–17 includes a first aperture 24 and a second aperture 25 which, when the members 12–17 are connected, form a hole, bore, or channel through the tool 10. It should be appreciated that holes 24, 25 are formed within tool 10 to allow a bolt/dowel/pin (not shown) to be inserted therein to further support tool 10 and assist in guiding or aligning each sectional member as it is abutted against its predefined adjacent sectional member.

Figure 4:
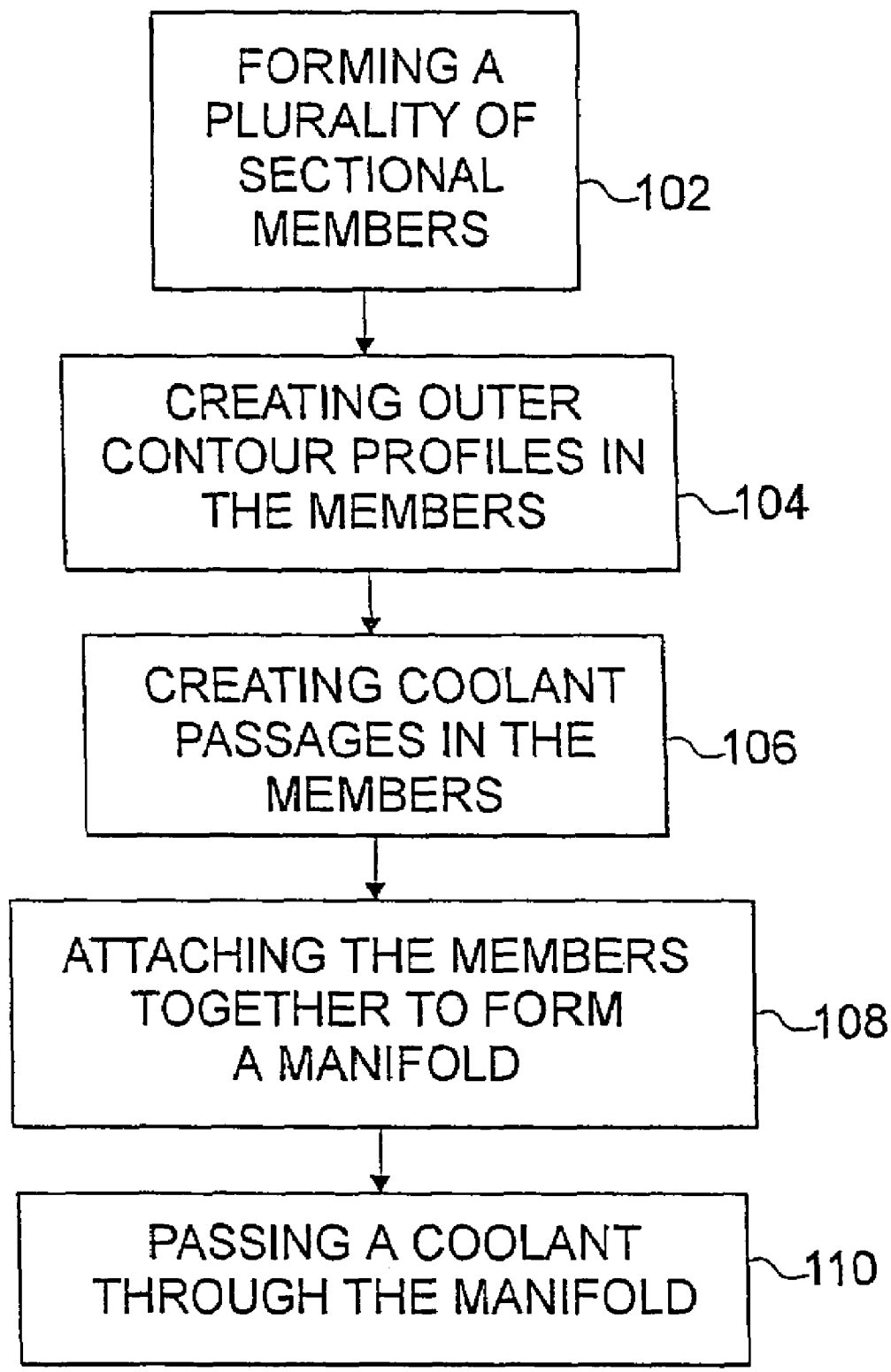
FIG. 4 is a flow chart showing a method for forming the tool which is shown in FIGS. 1–3.

As shown in FIG. 4, a method 100 for cooling a tool 10 is provided. Particularly, method 100 begins at step 102 in which a plurality of sectional members 12–17 are formed. Step 104 follows step 102 and in this step a certain outer contour 19 is formed upon each of the sectional members formed in step 102. Step 106 follows step 104 and in this step a plurality of coolant passages 14 and/or apertures 20, 22 are formed within sectional members 12–17 a predetermined distance from the respective outer contour 19. Additionally, each coolant passage 14 within a unique sectional member, e.g., sectional member 16, is set apart or separated from the other coolant passages 14 formed therein.

Step 106 is followed by step 108 and in this step each sectional member 12–17 is attached and coupled to the corresponding and adjacent sectional member to cooperatively form tool 10. Each individual contour 19 abuts the contour 19 of the adjacent sectional member to form a relatively smooth forming or mold surface 11. Additionally, each coolant passage 14 communicatively couples with the coolant passage 14 of the adjacent sectional member to form a coolant manifold portion 18. It should be appreciated that the separations between coolant passages formed in a particular sectional member, e.g., sectional member 16, form support members 23 within the manifold 18. As is best shown in FIG. 3, support members 23 are distributed throughout manifold 18 by gradually increasing and decreasing the size and location of coolant passages 14 and the separations between the passages 14 between adjacent sectional members, e.g., sectional members 12, 13.

Step 110 follows step 108 and in this step a coolant material 40 is passed through manifold 18 and removes heat from tool 10. It should be appreciated that turbulent flow attributed to the offset configuration of adjacent sectional members and/or to the non-linear path through manifold 18 caused by support members 23 further increase the heat transfer effects provided by the above methodology.

It is to be understood that the invention is not limited to the exact construction and method steps which have been described above, but that various changes and modifications may be made without departing from the spirit and the scope of the inventions as are more fully delineated in the following claims. For example and without limitation, steps 102, 104, and 106 of methodology 100 described above may be performed in substantially any order and/or combined to accommodate various manufacturing techniques or equipment which may be available.

It should further be appreciated that substantially any liquefied material may be used as coolant 40 and that the above description should not be limited to the above delineated materials alone and that other materials which provide for thermal transfer in tool 10 are may be used in the above described manner. In other non-limiting embodiments, manifold 18 may include additional injection molding features such as ejector pin sleeves (not shown) that are formed in a substantially similar manner to that described above for forming support members 23. That is, cooling passages 14 and support members 23 may be arranged within manifold 18 to form voids or channels that permit an ejector pin to be inserted therein to assist in ejecting a part formed within tool 10.

Additionally, the above description provides a tool 10 having a manifold 18 which may be used to cool the tool 10 by forcing a coolant material 40 through the manifold 18. It should be readily appreciated that the above described manifold 18 in tool 10 may be utilized with a material similar to material 40 (e.g., an oil) which is pre-heated to provide additional thermal energy (i.e., heat) to the tool 10. That is, the principles of thermal transfer between the tool 10 and the material 40 passing there through may be applied in situations where the tool 10 may need to be heated rather than cooled and/or cycled between heated and cooled during the manufacturing process. For example and without limitation, both a first coolant source 39 and second heated source 39 (i.e., a source 39 coupled to a heater assembly) may be coupled to conduits 20, 22 of tool 10 to selectively supply heated or cooled material through manifold 18.

What is claimed is:

1. A tool comprising a plurality of generally planar sectional members which are coupled together at adjacent planar surfaces of said plurality of sectional members, wherein each of said plurality of sectional members have at least one coolant passage formed through at least one planar surface of the sectional member and wherein at least one of said sectional members has an outer contour which is disposed a certain predetermined distance from the coolant passage which is formed within said at least one sectional member, wherein said at least one coolant passage of each sectional member cooperatively forms a coolant manifold, and wherein at least another of said sectional members has an outer contour, and said outer contours of the at least one and the at least another sectional members cooperatively form a forming surface.

2. The tool of claim 1 wherein said coolant manifold includes a plurality of support members which form winding paths through said coolant manifold.

3. The tool of claim 2 further comprising an amount of coolant which is selectively disposed within said coolant manifold, effective to cool said tool.

4. A laminated tool having improved cooling characteristics, said tool comprising:
a plurality of first sectional members each having a certain contour and at least one cooling passage which is a certain predetermined distance from said certain contour;
wherein said plurality of sectional members are coupled together, effective to cause said certain contours to form a forming surface and to cause said at least one cooling passages to form a cooling manifold; and
an amount of material which is disposed within said cooling manifold, effective to cool said tool.

5. The laminated tool of claim 4 wherein said certain predetermined distance is a minimum wall thickness to prevent deflection of said tool.

6. The laminated tool of claim 4 wherein said at least one cooling passages comprise at least two cooling passages which are spaced apart to form support members within said cooling manifold.

7. The laminated tool of claim 6 wherein said support members form a non-linear path through said coolant manifold.

8. The laminated tool of claim 7 wherein said material is water.

9. The laminated tool of claim 4 further comprising:
a second plurality of sectional members having at least one aperture, wherein said second plurality of sectional members are connected together and said at least one apertures are substantially aligned to form at least one first conduit;
wherein said second plurality of sectional members are coupled to said first plurality of sectional members and said at least one first conduit is communicatively coupled to said coolant manifold.

10. The laminated tool of claim 9 further comprising:
a third plurality of sectional members having at least one aperture, wherein said third plurality of sectional members are connected together and said at least one apertures are substantially aligned to form at least one second conduit;
wherein said third plurality of sectional members are coupled to said first plurality of sectional members opposite to said second plurality of sectional members and said at least one second conduit is communicatively coupled to said coolant manifold.

11. The laminated tool of claim 9 further comprising a source of said material, wherein said source is communicatively coupled to said at least one first conduit.

12. A method for forming a tool having improved cooling characteristics, said method comprising the steps of:
forming at least one first member having a first outer contour and at least one first inner passage which is disposed a certain minimum distance from said first outer contour;
forming at least one second member having a second outer contour and at least one second inner passage which is disposed said certain minimum distance from said second outer contour; and
attaching said at least one first member to said at least one second member wherein said first outer contour cooperates with said second outer contour to form a mold surface and said first inner passage is communicatively couple to said second inner passage to form a manifold.

13. The method of claim 12 further comprising the steps of:
providing an amount of coolant material, and
passing said coolant material through said manifold, thereby cooling said tool.

14. The method of claim 13 wherein said at least one first inner passage and said at least one second inner passage each comprise at least two passages, said method further comprising the steps of:
separating said at least two first inner passages to form a portion of a support member; and
separating said at least two second inner passages to form a second portion of said support member;
wherein said first portion and said second portion cooperatively form said support member.

15. The method of claim 13 wherein said at least one second inner passage is offset from said at least one first inner passage, said method further comprising the step of:
causing turbulent flow within said coolant as said coolant passes through said manifold.

16. The tool of claim 1 wherein said generally planar sectional members are further defined as laminate sectional members wherein the coolant passages of adjacent laminate sectional members are aligned to cooperatively form the coolant manifold.

17. A tool comprising a plurality of generally planar sectional members which are coupled together at adjacent planar surfaces of said plurality of sectional members, wherein each of said plurality of sectional members have at least one coolant passage formed through at least one planar surface of the sectional member and wherein at least one of said sectional members has an outer contour which is disposed a certain predetermined distance from the coolant passage which is formed within said at least one sectional member, wherein said at least one coolant passage of each sectional member cooperatively forms a coolant manifold, and wherein the outer contour is disposed on an outer peripheral edge of at least two adjacent laminate sectional members.

* * * * *

UNITED STATES PATENT AND TRADEMARK OFFICE
CERTIFICATE OF CORRECTION

| | | |
|---|---|---|
| PATENT NO. | : 7,195,223 B2 | Page 1 of 1 |
| APPLICATION NO. | : 10/308602 | |
| DATED | : March 27, 2007 | |
| INVENTOR(S) | : Mark Manuel and Thomas Greaves | |

It is certified that error appears in the above-identified patent and that said Letters Patent is hereby corrected as shown below:

Column 8, line 13, claim 12 - delete "couple" and insert -- coupled--.

Signed and Sealed this

Tenth Day of July, 2007

JON W. DUDAS
*Director of the United States Patent and Trademark Office*